June 30, 1964   A. G. CAGE, JR   3,139,492
REPOSITIONABLE CONNECTOR PLUG WITH POSITION ELIMINATOR MEANS
Filed Jan. 11, 1961   3 Sheets-Sheet 1
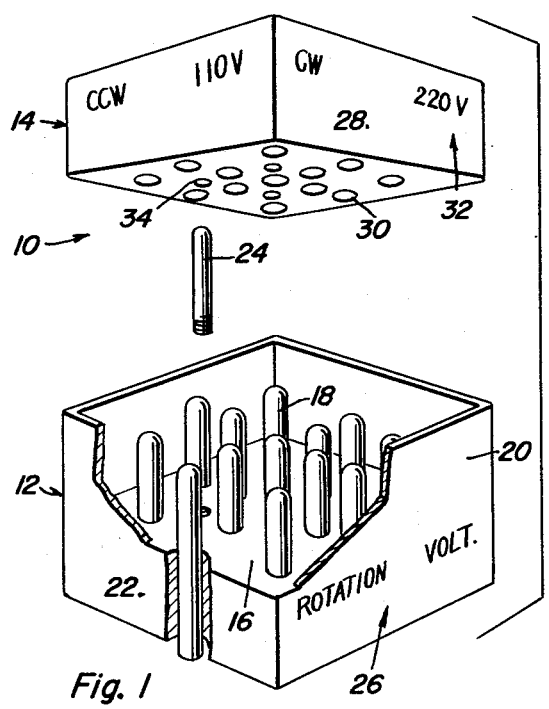
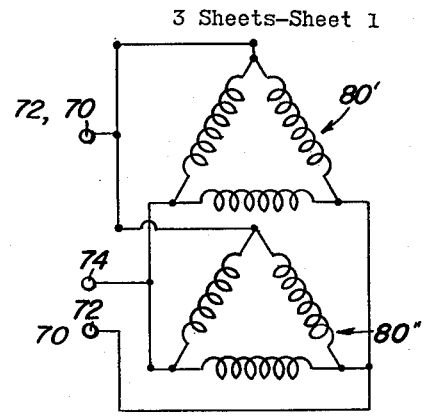
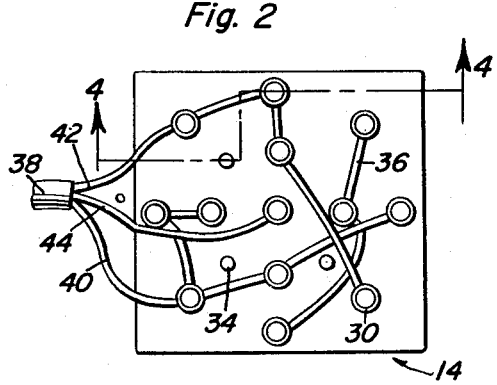
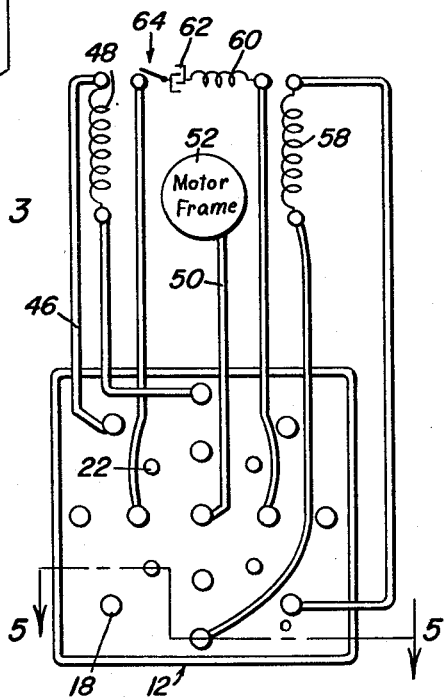
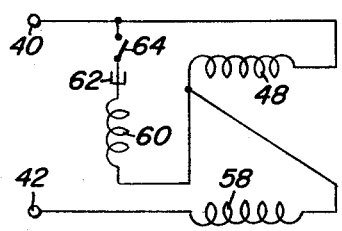
Albert G. Cage Jr.
INVENTOR.

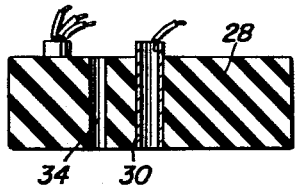
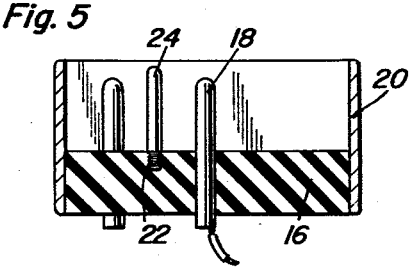
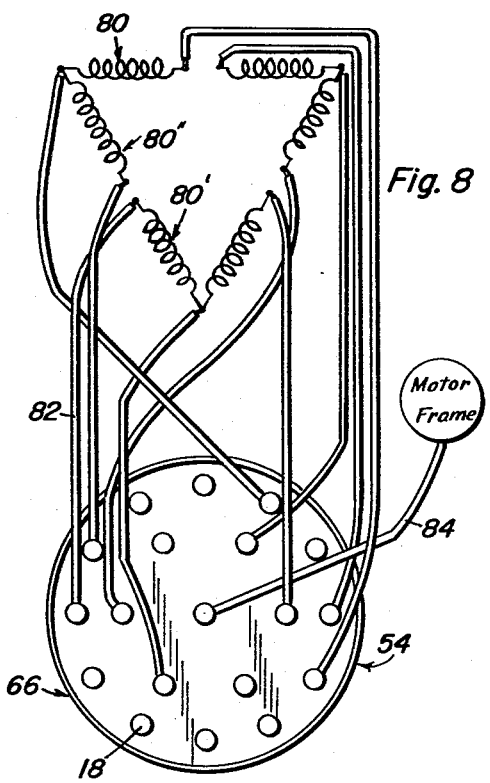
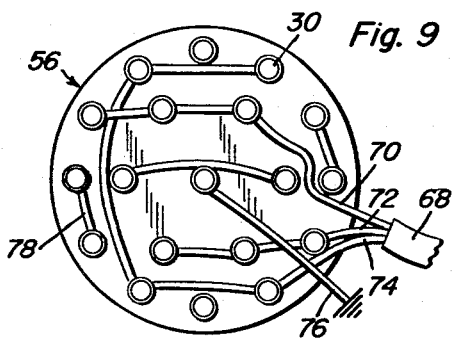

June 30, 1964  A. G. CAGE, JR  3,139,492
REPOSITIONABLE CONNECTOR PLUG WITH POSITION ELIMINATOR MEANS
Filed Jan. 11, 1961  3 Sheets-Sheet 3

Albert G. Cage, Jr.
INVENTOR.

United States Patent Office 3,139,492
Patented June 30, 1964

3,139,492
REPOSITIONABLE CONNECTOR PLUG WITH POSITION ELIMINATOR MEANS
Albert G. Cage, Jr., Box 5, Yauco, Puerto Rico
Filed Jan. 11, 1961, Ser. No. 82,009
5 Claims. (Cl. 200—11)

This invention relates to an electrical connector device for obtaining a plurality of different circuit connections by mere repositioning of the connector device.

It is therefore a primary object of this invention to provide an electrical connecting device for connecting together two groups of conductors in two or more different ways providing a different result. It will be appreciated that many electrical appliances such as electric motors may be operatively hooked up with a power source in several different ways in order to achieve different results for different operations of the appliance. With regard to electric motors for example, by reversing the input connection to the starting windings and running windings, the rotation of the motor may be reversed and by changing the winding connections the voltage may be changed. The operation of other electrical equipment may similarly be varied as for example the changing of taps on transformer equipment and many other electrical devices. In all of the above exemplary instances, the change in operation may be effected by changing the circuitry which in turn may be accomplished by changing the connection between the power source and the circuit elements. The utility of the connecting device of the present invention will therefore become readily apparent.

A further object of this invention in accordance with the foregoing objects, is to provide an electrical connector device including sections that may be interfitted with each other in several different relative positions in order to achieve the different circuit connections hereinbefore referred to. Accordingly, one section mounts a plurality of electrical connectors arranged in a pattern for coaction with electrical connectors mounted in the other section for each of the different relative positions predetermined by the number and pattern of the connectors. Accordingly, in order to make the different circuit connections selected connectors on the respective sections will be interconnected by conductors while other of the connectors will respectively be connected to the power source and the circuit load elements.

A further object of the invention is to provide a multi-position electrical connector device wherein some of the positions in which the connectors are ordinarily alignable, may be eliminated by barring interfitting of plugs by means of holes mounted in one of the plugs and eliminator pins removably mounted in the other of the plugs which eliminator pins will be in alignment with no holes in those positions of the plug which are desired to be eliminated.

From the foregoing objects, it will be appreciated that the connector device of the invention contemplates the use of plug elements of various sizes, shapes and mounting any number of connector pins and corresponding sockets. Also the field of use for the electrical connecting device although described with respect to some specific examples, is not necessarily restricted thereto but has wide application. It will also be appreciated that for any particular design of the connector device made in accordance with this invention, by eliminating the undesirable relative positions of the plug through use of the novel eliminator pin and by varying the conductor connections within the plugs between the connector pins or sockets, any single design of a connector device may be applied to a wide range of electrical appliances and equipment.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view with parts shown in section of one form of an electrical connector device made in accordance with this invention.

FIGURE 2 is a schematic view of the female plug of the connector device illustrated in FIGURE 1.

FIGURE 3 is a schematic plan view of the male plug illustrated in FIGURE 1.

FIGURE 4 is a sectional view taken through a plane indicated by section line 4—4 in FIGURE 2.

FIGURE 5 is a sectional view taken through a plane indicated by section line 5—5 in FIGURE 3.

FIGURES 6A, 6B, 7A and 7B are diagrams of different circuits achieved by the different connection offered by the connector device illustrated in FIGURES 1 through 5.

FIGURE 8 is a schematic view of a male plug of a second form of connector device.

FIGURE 9 is a schematic view of the female plug associated with the male plug illustrated in FIGURE 8.

FIGURES 10 and 11 are diagrams of different circuits capable of being achieved by the different connections possible with the connector device illustrated in FIGURES 8 and 9.

Figure 12:
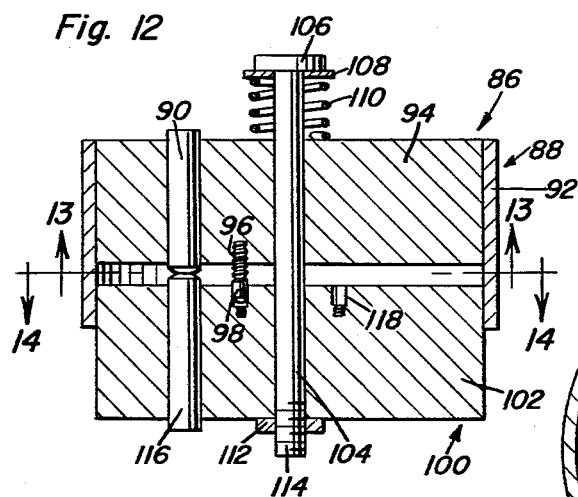
FIGURE 12 is a sectional view of a modified construction of a connector device.
Figure 13:
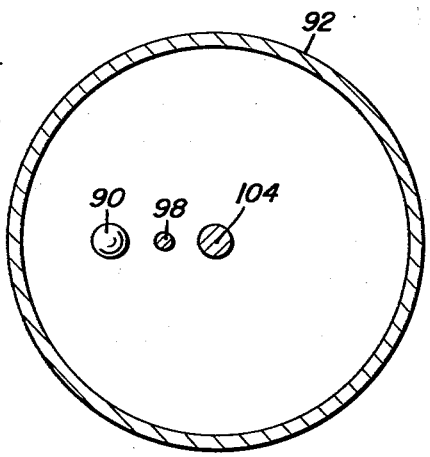
FIGURE 13 is a sectional view taken through a plane indicated by section line 13—13 in FIGURE 12.
Figure 14:
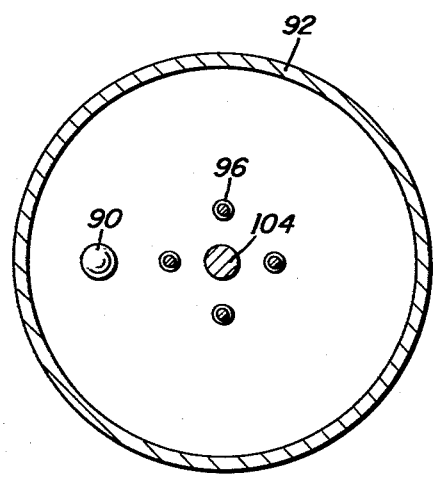
FIGURE 14 is a sectional view taken through a plane indicated by section line 14—14 in FIGURE 12.
Figure 15:
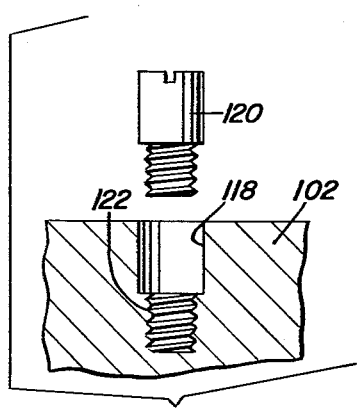
FIGURE 15 is a sectional detail view of an eliminator plug and aligning hole.

Referring now to the drawings in detail, FIGURE 1 illustrates one form of connector device made in accordance with this invention. The connector device is generally referred to by reference numeral 10 and includes a section 12 and a section 14. It will therefore be appreciated that the sections 12 and 14 are interfitted with each other in four different relative positions corresponding to the four sides of each of the sections 12 and 14. As a result of the different relative interfitted positions of the sections 12 and 14, various different circuit connections may be made between a power source and some electrical appliance or equipment as will be hereafter explained with respect to one specific exemplary appliance.

It will be observed from FIGURES 1 and 5, that the section 12 includes a four sided base member 16 made of non-conductive material and having embedded therein a plurality of connector pins 18. Disposed about the base 16 is a shroud member 20 which is provided for the purpose of providing a protective enclosure about the section 14 when interfitted with the section 12. Also disposed within the base member 16 of the section are a plurality of eliminator pin receiving apertures 22 for the purpose of threadedly receiving removable eliminator pins 24. It will also be observed that the exterior surface of the male section 12 may have indicia 26 thereon for the purpose of identifying the function achieved by the different relative positions of the sections 12 and 14. For example, as seen in FIGURE 1, one side of the section 12 has labeled thereon "rotation" and "volt." Accordingly, the section 14 may be interfitted with the section 12 at the desired relative position for achieving the indicated direction of rotation and voltage value labeled on the corresponding side of the section 14.

Referring therefore to FIGURES 1 and 4, it will be observed that the section 14 comprises a non-conductive base member 28 also having four sides which fit within the shroud 20 on the sections 12 so that the socket members 30 embedded therein may receive the connector pins 18 aligned therewith for each of the four different relative positions. Labeling indicia 32 is therefore provided on all four side faces of the sections 14 in order to identify the function to be achieved by any particular relative position between the sections 12 and 14. It will therefore be noted that each side of the section 14 includes both the rotational direction and voltage value for alignment with the single labeled side of the section 12.

It will be observed from FIGURE 2 that holes 34 are disposed within the section 14 corresponding to three of the four available interfitting positions within which the eliminator pins 24 may be received. If all four positions of the connector device 10 are needed, no eliminator pin 24 will be utilized. However, if any one of the four positions is to be eliminated for any reason, an eliminator pin need only be inserted in one of the apertures 22 in order to eliminate the position associated with said aperture.

It will be noted that for the four positions possible with the device 10, three eliminator pin receiving holes 34 are provided in the section 14 for cooperation with any eliminator pins 24 that may be inserted in any one or all of the pin receiving apertures 22 within the base 16 of the section 12, four of such apertures 22 being provided. Accordingly, one less hole 34 than the total possible number of positions will be needed in order to provide for the elimination of all positions to no positions. It should of course be understood that the mounting of the eliminator pin 24 in either of the sections 12 or 14 may be resorted to with the pin receiving hole 34 being in the other of the sections.

The device 10 accordingly is schematically illustrated in FIGURES 2 and 3 as a four position connector device having 13 connector pin and socket points on each section.

It will be noted in FIGURE 2, that the section 14 is provided with conductors 36 which electrically interconnect selected socket members 30. It will also be observed that a power line 38 is provided which includes power leads 40 and 42 and a ground lead 44. The leads 40, 42 and 44 are also connected to selected socket members 30. Referring now to FIGURE 3, it will be observed that selected connector pins 18 are connected by a plurality of circuit leads 46 to various load elements of an electrical appliance. The appliance illustrated in FIGURE 3 schematically is a single phase, double voltage, capacitor induction motor which includes motor running windings 48 and 58 a starter winding element 60 connected in series with a capacitor 62 and with a centrifugally operable switch device 64. The induction motor elements 48, 58, 60, 62 and 64 are conventional and well-known to those skilled in the art. Also, a ground connection 50 is provided between the centrally disposed connector pin and the motor frame 52. Operation of the induction motor schematically illustrated may be achieved by applying current through the running winding 48 and 58 arranged in series with the starter winding 60 and capacitor 62 being connected in parallel with one of the sections of the running winding and cut out by the centrifugally operable switch device 64 when the motor has started up. With a 220-volt input, the induction motor may thereby be operated as a 220-volt induction motor as schematically diagrammed in FIGURE 6A. In order to change the direction of the motor, it will only be necessary to reverse the starting winding leads, leaving the power leads 40 and 42 to the running windings 48 and 52 unchanged as illustrated in FIGURE 6B. Accordingly, in order to obtain higher voltage operation of the induction motor in either direction of rotation two positions of the connector device 10 will afford the requisite connections for obtaining the circuits illustrated in FIGURES 6A and 6B. In FIGURE 7A, 110-volt operation of the motor is achieved by connecting the running winding sections 48 and 58 in parallel across the power lines 40 and 42. A change in direction is achieved by reversing the starting winding leads leaving the running winding leads unchanged as illustrated in FIGURE 7B. Accordingly, two different positions of the connector device 10 will provide the circuits diagrammed in FIGURES 7A and 7B for obtaining the lower voltage operation of the motor in both directions of rotation.

Referring now to FIGURES 8 and 9, a second form of connector device generally indicated by reference numeral 54, is illustrated. It will therefore be observed that the sections 56 of the device 54 has nineteen sockets 30 mounted thereon for receiving the nineteen connector pins 18 mounted on the male section 66. It will also be observed that the connector pins 18 and sockets 30 are so arranged that only six different relative positions of the sections 56 and 66 will be available. Of these six available positions, however, only four will be needed in which case the appropriate location and numbers of eliminator pins 24 and holes 34 will be provided in the sections 56 and 66 pursuant to the principles set forth hereinbefore in order to eliminate two of the available positions. It will be understood of course that other usable positions may also be eliminated by use of additional eliminator pins. It will therefore be noted that the power line 68 is operatively connected to the selected sockets 30 in the section 56. In the example illustrated in FIGURE 9, the three-phase power source is utilized including power lines 70, 72 and 74. The center socket 30 is connected to ground by conduit 76. Selected sockets 30 are also interconnected by interconnecting conductors 78.

Referring now to FIGURE 8 it will be observed that the appliance schematically illustrated is a double voltage, three-phase induction motor including delta connected windings generally indicated by reference numeral 80. The delta windings are interconnected to selected pins 18 by a plurality of conductors 82 while the center connector pin is connected to the motor frame by conductor 84. Accordingly, by interfitting the sections 56 and 66 various circuit connections between the power line 68 and the induction motor delta winding 80 may be effected in order to obtain different operations of the induction motor. Accordingly two of the relative positions of the sections 56 and 66 will produce the circuit schematically diagrammed in FIGURE 10 in which case a higher voltage operation in two different directions may be achieved. It will be noted that the delta windings are separated into two sections 80' and 80" which may be so connected as to provide the single delta winding as diagrammed in FIGURE 10 corresponding to two of the operative positions of the connector sections 56 and 66. In order to achieve the lower voltage operation for the induction motor, circuit connections as diagrammed in FIGURE 11 may connect the delta sections 80' and 80" in parallel between the lead lines 70, 72 and 74. It will also be appreciated with respect to both FIGURES 10 and 11 that reversing two of the connections will achieve a reversal in the rotational direction of the motor. Accordingly, by the four different operative positions between the sections 56 and 66 low and high voltage operation in a clockwise and counter-clockwise direction for the motor may be achieved by appropriate connection to the power source 68 by the connector device 54.

From the foregoing description, the principle of operation and utility of the connector device of this invention will be apparent. It will also be understood that although two specific circuit connecting applications of connector devices have been described, the connector device may equally be useful for varying the operation of many different electrical appliances and equipment. As a result of the use of the novel connector device of this invention, circuit changing may be accomplished without any complicated switching mechanism in a relatively simple, inexpensive and efficient manner. Also, repositioning may be restricted either by virtue of both the interfitting pin and sockets and the configuration of the connector device in the case of equilateral polygons or by the interfitting of pins and sockets alone in the case of circular configurations. It should also be realized that in practice, suitable contact pressure producing expedients may be resorted to, in order to obtain the requisite contact pressure between connector pins and sockets for good electrical contact.

FIGURES 12 through 15 disclose another construction for the principles hereinbefore described with respect to connector device 12 of FIGURES 1, 4 and 5 and may therefore be cross-sectionally varied in accordance therewith and utilized for different electrical circuits by variation in the number of electrodes utilized. The connector device 86 as shown in FIGURE 12 includes a section 88 similar to male section 12 of device 10 (FIG. 1) including an exemplary connector pin 90 and a cover member 92 disposed about the non-conductive mounting block 94. Threaded eliminator holes 96 are also provided in the block 94 which may threadedly receive an aligning pin 98 to constitute a position sensing means for the contact positions.

The other section 100 of the device 86 similar to section 14 of device 10, includes a block 102 received within the cover member 92 of section 88, but unlike device 10 is held permanently assembled thereto by a center bolt 104 extending through aligned center bores in the blocks 94 and 102. One end of the bolt has the head 106 and washer 108 against which a spring 110 reacts to bias block 94 against block 102 which is axially held against nut 112, adjustably positioned on the threaded end 114 of the bolt 104. The center bolt 104 thus also replaces the pin and socket ground connection of device 10.

The sockets with which the connector pins may coact to make an electrical connection are replaced by additional connector pins 116 in the device 86, mounted in block 102 for contact with pin 90. For each operating position between sections 88 and 100, pins 90 and 116 will make contact under pressure of spring 110 and aligning pin 98 will be received within an alignment hole 118 in the block. In changing connections by changing the relative position of the sections 88 and 100, the blocks will be axially displaced against the spring bias and rotated, with the aligning pins 98 then maintaining the blocks cammed in out-of-contact spacing until the next operative contact position is reached. It will therefore be apparent that device 86 has the advantages of never being disassembled, providing contact pressure and positive operative position sensing means.

In order to eliminate any of the connector positions, eliminator plugs 120 are provided for threaded insert into internally threaded portions 122 of the aligning holes 118 thus preventing axial contact between connectors 90 and 116 for the position corresponding thereto.

It should be understood with respect to device 86, that the spring and bolt, cover member and aligning holes and aligning pins may individually be reversed with respect to their mountings in the sections 88 and 100 of the connector device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An electrical connector device comprising, a pair of rotationally repositionable connector mounting means interfitting with each other in more than two different contact positions relative to each other, circuit connection means operatively connected to each mounting means operative to form a plurality of different circuits in different contact positions, position eliminator means mounted on the connector mounting means for blocking any number of selected contact positions of the connector mounting means, a plurality of connector pins projecting from one connector mounting means in a prearranged pattern, a plurality of sockets disposed in the other mounting means equal in number and pattern to the connector pins so as to predetermine the different relative contact positions of the mounting means, conductor means interconnecting selected connector pins and sockets in the respective mounting means, said mounting means including non-conductive bases for mounting the connector pins and sockets, a shroud disposed about one of the mounting means for receiving the other mounting means in protective relation thereto and yieldable pressure means for holding said mounting means in assembled relation and providing contact pressure for said connector pins.

2. An electrical connector device comprising, a pair of rotationally repositionable connector mounting means interfitting with each other in more than two different contact positions relative to each other, circuit connection means operatively connected to each mounting means operative to form a plurality of different circuits in said different contact positions, position eliminator means mounted on the connector mounting means for blocking any number of selected contact positions of the connector mounting means, a plurality of connectors mounted in each mounting means in contacting relation for each of said different relative contact positions, yieldable pressure means operatively connected to each mounting means for holding the mounting means in assembled relation and providing contact pressure between contacting connectors and position sensing means operatively mounted in said mounting means permitting pressure contact of the connectors only in said different relative contact positions.

3. The combination of claim 2 wherein said eliminator means is operative to disable said sensing means for selected contact positions to eliminate said selected relative contact positions.

4. The combination of claim 3 wherein said pressure means includes a center bolt extending through both mounting means and axially fixed to one mounting means and spring means operatively mounted on said bolt for biasing said mounting means toward each other.

5. The combination of claim 4, wherein said sensing means includes aligning holes disposed in one of the mounting means and aligning pins mounted in the other of the mounting means for reception within the aligning holes for each of the different relative contact positions.

References Cited in the file of this patent

UNITED STATES PATENTS

| | | |
|---|---|---|
| 2,594,069 | Poehlmann | Apr. 22, 1952 |
| 2,727,215 | Brown | Dec. 13, 1955 |
| 2,792,559 | Maberry | May 14, 1957 |
| 2,922,054 | Miller | Jan. 19, 1960 |
| 2,928,998 | Brumfield | Mar. 15, 1960 |
| 3,017,603 | Bac | Jan. 16, 1962 |

FOREIGN PATENTS

| | | |
|---|---|---|
| 345,492 | Great Britain | Mar. 26, 1931 |
| 634,004 | Great Britain | Mar. 15, 1950 |